Oct. 31, 1967   T. R. SHIREY, JR   3,349,862
POWER DRIVE FOR WHEELED VEHICLE
Filed Nov. 15, 1965   3 Sheets-Sheet 3

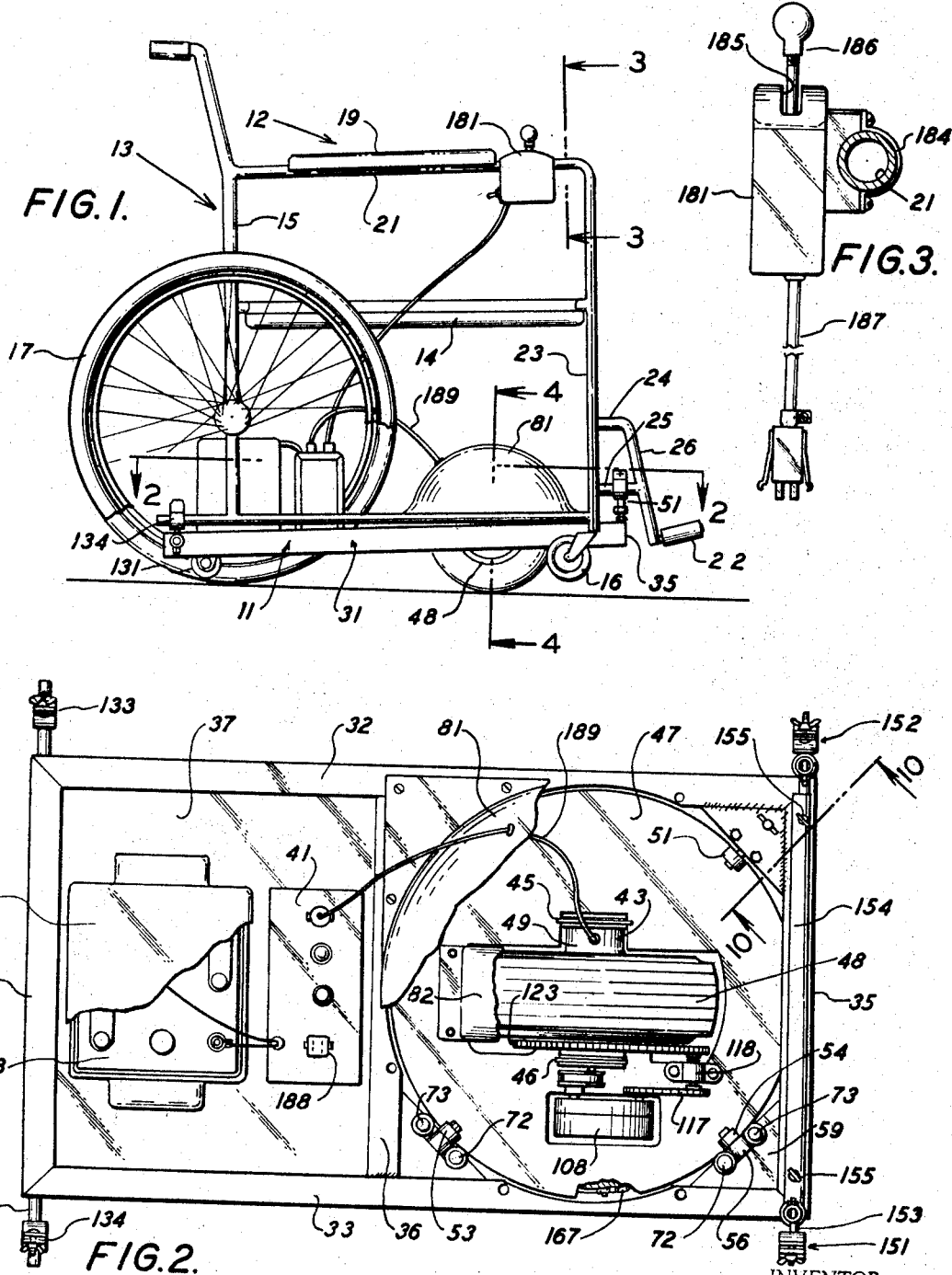

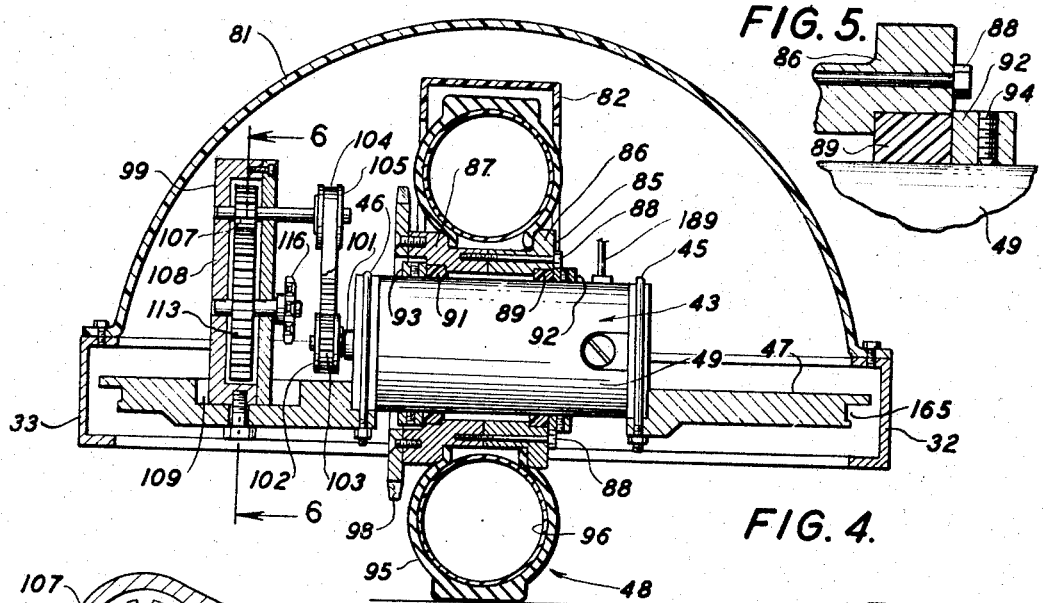

INVENTOR.
THEODORE R. SHIREY, JR
BY
W. J. Gribble
ATTORNEY

United States Patent Office 3,349,862
Patented Oct. 31, 1967

3,349,862
POWER DRIVE FOR WHEELED VEHICLE
Theodore R. Shirey, Jr., Ontario, Calif.
(226 S. Campus Ave., Upland, Calif. 91786)
Filed Nov. 15, 1965, Ser. No. 507,783
4 Claims. (Cl. 180—15)

ABSTRACT OF THE DISCLOSURE

A battery powered drive unit for attachment to a wheel chair or other wheeled vehicle wherein the unit has a steering turntable that is roller-mounted in a shallow bed. The turntable holds an electric motor. The motor case journals a drive wheel centrally of the case. The steering axis of the turntable passes through the central portions of the motor and the wheel. The clamping means that attach the drive unit to the vehicle are arranged to hold one pair of vehicle wheels away from the ground when unit and vehicle are joined.

---

The invention relates to self-powered drive units, and more particularly to drive unit attachments for use on wheeled vehicles, such as wheel chairs.

Many attempts have been made to devise a self-powered unit which can be attached and used in conjunction with other wheeled vehicles such as wheel chairs, carts, and small industrial trucks such as those used in warehousing. In each of these usages a power unit must contain its own power source, be easily attachable and detachable from the vehicle and have easy maneuverability. I have invented a power-drive carriage which not only meets the above qualifications but is also capable of sustained operation. The invention contemplates a power drive carriage for attachment to a wheeled vehicle that comprises a shallow bed which may have a channel framework, an electrical power source on the bed and a reversible electrical motor on the bed. Preferably the motor is one having a permanent magnet field. A drive wheel journalled on the motor case so as to revolve thereabout is preferably rubber-tired. The motor and drive wheel are mounted on turning means on the bed. The turning means is such that the motor and drive wheel turn with respect to the carriage bed about a vertical axis that passes through the center of the drive wheel. Power transmission means connect the motor and the drive wheel. A motor speed and direction control box adapted to be attached to the wheeled vehicle is connected in series between the power source and the motor. Preferably the control box embodies an electrical rheostat. Attachment means on the bed are adapted to connect the carriage bed to the wheeled vehicle. The attachment means are such that the single drive wheel of the power drive carriage supports the wheeled vehicle with the front wheels of the vehicle being out of contact with the ground or floor.

In a preferred embodiment of the invention, the power drive carriage is adapted for use with a four-wheeled chair. The power source then comprises a battery and a battery charger. The drive carriage may have a pair of small wheels at the rear of the carriage bed to facilitate movement of the power drive carriage when not attached to the vehicle. The attachment means are such that the small rear wheels of the bed are not in contact with the ground when the carriage is attached to the vehicle.

In the preferred embodiment the turning means for the motor and drive wheel comprises a roller-mounted turntable within the shallow bed and turned by means of a sprocket chain fixed to the turntable at both of its ends. The sprocket chain passes over a steering sprocket from which a vertically journalled control rod extends. As the control rod is turned by an upper handle the sprocket in engagement with the chain displaces the chain and pulls the turntable in a horizontal plane. The axes of rotation of the turntable and of the drive wheel cross such that the drive wheel pivots when steered about a vertical axis that passes through the axis of rotation of the wheel. The power carriage is thus extremely maneuverable, as the drive wheel effects steering changes as well.

These and other advantages of the invention are apparent from the following detailed description and drawing in which:

FIG. 1 is a side elevation of a power drive carriage in accordance with the invention attached to a conventional wheel chair;

FIG. 2 is a plan section taken along line 2—2 of FIG. 1 and partly broken away;

FIG. 3 is a fragmentary sectional elevation taken along line 3—3 of FIG. 1;

FIG. 4 is a fragmentary sectional elevation taken along line 4—4 of FIG. 1;

FIG. 5 is an enlarged detail of the journal mounting the drive wheel to the motor case;

FIG. 6 is a fragmentary sectional elevation taken along line 6—6 of FIG. 4;

FIG. 7 is a fragmentary sectional elevation, partly broken away, of a jackshaft in the power transmission assembly;

FIG. 8 is a fragmentary sectional elevation, partly broken away, and showing the bed front attachment means;

FIG. 9 is a fragmentary sectional elevation, partly broken away, showing the bed rear attachment means;

FIG. 10 is a fragmentary sectional elevation taken along line 10—10 of FIG. 2;

Figure 11:
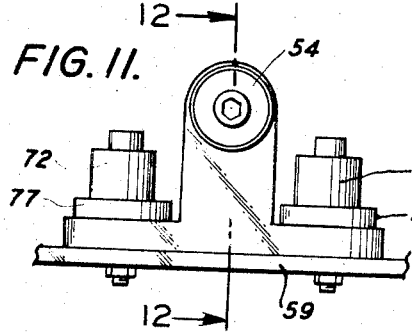
FIG. 11 is a detail of a set of contact rollers for the turntable.
Figure 12:
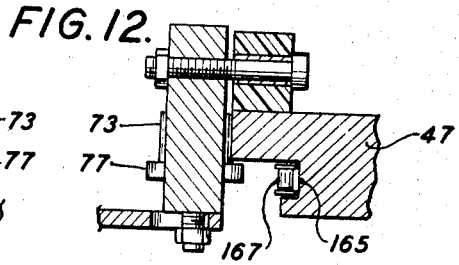
FIG. 12 is a sectional elevation taken along line 12—12 of FIG. 11.
Figure 13:
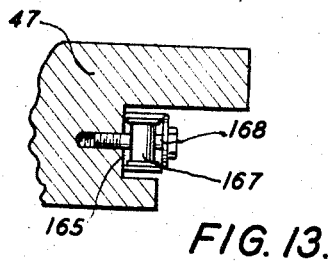
FIG. 13 is a fragmentary sectional elevation showing the anchoring means for the turntable sprocket chain.

In FIG. 1 a power drive carriage 11 is shown attached to a conventional wheel chair 12. The wheel chair has a tubular frame 13 with a seat 14 and a back 15. The wheel chair has small swivel-mounted front wheels, such as wheel 16, and a pair of larger rear wheels like wheel 17. The chair also has armrests like rest 19 fixed to a tubular arm 21. A footrest 22 projects from the front of the chair, secured to spaced tubular uprights 23 of the chair by horizontal braces 24, 25 and vertical tubular supports 26.

The chair also has a pair of bottom tubular side members 28 which extend for most of the legnth of the chair on each side thereof between spoked rear wheels 17.

Power drive unit 11 has a shallow bed 31 comprised of channel-shaped side rails 32, 33 and like end rails 34, 35. An intermediate brace 36 extends between side rails 32 and 33. A rear deck 37 is supported by rails 32, 33, 34 and brace 36. A power source which is preferably a 12-volt battery 38 rests upon deck 37 within a shroud 39. An A.C. battery-charging unit 41 is secured to the deck forwardly of the battery. The battery charger and battery supply the motive power for a permanent magnet motor 43 secured by U-shaped brackets 45, 46 to a circular turntable 47. A drive wheel 48 is journalled on a motor case 49 of the motor.

As shown in FIG. 1, the drive wheel rests upon the ground and supports the turntable. A plurality of thrust rollers 51–54 are attached by means of brackets, such as a bracket 56, to the shallow bed. The brackets are secured to corner angles 59, which span the adjacent flanges 61, 62 of the adjacent bed channel members. The angle bracket 59A supporting thrust roller 51 is fixed to the top flanges 64 of side member 32 and front member 35. A second corner bracket 66 is fixed to the bottom flanges 61, 62 of those channel members. The brackets 59A, 66 journal a steering control 67 in a vertical position for use in steering the wheeled vehicle in a manner to be described later.

Each bracket 56 supports a vertical thrust roller 51 upon a pivot pin 71. Each bracket additionally supports a pair of spaced radial thrust rollers 72, 73 adapted to contact the circular rim 75 of turntable 47. Each radial thrust roller has a retainer collar 77 residing beneath the turntable which precludes vertical displacement of the shallow bed with respect to the turntable.

A semispherical hood 81 fixed to the shallow bed covers the turntable and the drive wheel and motor. A semicylindrical fender 82 fixed to the turntable shrouds drive wheel 48.

As can be seen from FIGS. 4 and 5, drive wheel 48 comprises a split wheel 85 whose component halves 86, 87 are secured together by a plurality of bolts 88. Cylindrical case 49 of the permanent magnet motor 43 has fixed thereon a pair of spaced cylindrical bearing rings 89, 91. The bearing rings are retained on the motor case by a pair of collars 92, 93 fixed to the motor case each by a plurality of set screws 94. Split wheel 85 revolves on the bearing rings 89, 91 about the motor. The motor and the drive wheel thus have a common axis of rotation.

A pneumatic tire 95 is mounted on the split wheel in conventional fashion. The tire may contain an inner tube 96 or the tire may be a tubeless type. A drive sprocket 98 is fixed to one-half of the split wheel. The drive sprocket is impelled by a power train 99 in the following manner: the output shaft 101 of motor 43 has a drive pulley 102 with a serrated drum 103. A drive belt 104 with inner teeth passes over pulley 102 and a similar but larger pulley 105. Pulley 105 is fixed to a shaft 106 fastened to a small spur gear 107 within a gear housing 108. The gear housing is adjustably secured within a recess 109 of turntable 47 by conventional bolts 110 passing through elongate slots 111 in the recess floor.

Gear 107 meshes with a larger spur gear 113 that is fixed to a shaft 114. The exterior end of shaft 114 supports a drive sprocket 116. A sprocket chain 117 links sprocket 116 with a jack shaft assembly 118, shown in detail in FIG. 7. The jack shaft 118A has like spur gears 119, 121 at each of its ends. A sprocket chain 123 passes over sprocket 121 and drive sprocket 98 on the drive wheel.

The power train affords positive transmission of the power output of the electric motor while affording the safety factor of belt slippage in extreme cases of locking of the drive wheel.

When normally attached to a wheeled vehicle, such as wheel chair 13 of FIG. 1, the drive wheel is in contact with the ground to be traversed. The small rear wheels 131 of the power carriage are normally out of contact with the ground, as are the small front wheel pair of the wheel chair. Thus the weight of the occupant of the chair is borne by the large wheel chair wheels and the power wheel of the power drive carriage.

The relative orientations of the various wheels are maintained by the attachment means of the power drive carriage. The carriage has rear attachment means 133, 134 at the rear corners of the shallow bed. As can be seen from FIG. 9, a cylindrical tube 136 is fixed to end member 34 by convenient means, such as welding, within the frame of the shallow bed. The tube extends across the width of the bed. From each of its ends an extension rod 137 protrudes exteriorly of the shallow bed through a hole 138 in a side rail. A wing bolt 139 clamps against extension rod 137 to secure it in desired orientation.

A bracket 141 clamps about the exterior end of the extension rod. A bolt and wing nut assembly 142 secures the bracket to the rod. The bracket has a pivot pin 144 which pivotally mounts an attachment hinge 145. The attachment hinge has formed leaves 146, 147, which, when brought together, define a cylindrical cavity adapted to clamp about a tubular frame member of the wheel chair. As shown in FIG. 1, attachment means 134 is secured by attachment hinge 145 about side member 28 of the wheel chair. The attachment is made secure by a second wing nut and bolt assembly 148.

Extreme flexibility of the rear attachment is obvious when it is considered that extension rod 137 may be varyingly spaced from side rail 33 and bracket 141 may assume any angle.

Each front attachment 151, 152 has an extensible rod 153 which may be extended varyingly from a cylindrical tube 154, which is fixed to a top flange 64 of front end rail 35. Wing bolts 155 secure the rods at the desired degree of extension. As can be seen from FIG. 8, each extensible rod 153 has a perpendicularly extending threaded shank 157. An internally threaded sleeve 158 is engaged with the threaded shank. An attachment hinge 159 similar to the hinge 145 previously described is pivotally mounted to an end of the sleeve. A locking collar 161 engaged with the threaded shank secures the threaded sleeve at the proper degree of extension from the line of extension of rod 153.

The front and rear attachments are capable of attaching the power drive carriage to the wheel chair such that power drive wheel 48 contacts the ground and front wheels 16 of the wheel chair are positioned away from the ground.

The steering mechanism of the power carriage is best seen with respect to FIGS. 2, 10, 12 and 13. In those figures turntable 47 is seen to have a peripheral recess 165. The indentation is sufficient to leave substantial clearance between it and the retainer collar 77 of each radial thrust roller. A length of sprocket chain 167 resides substantially within recess 165. Each end of the sprocket chain is fixed to a separate point on the turntable 47. As can be seen from FIG. 2, the chain is fixed at a point substantially in alignment with the horizontal axis of rotation of the drive wheel. Means such as a bolt and washer assembly 168 passing through the chain between rollers and threadably engaging the turntable may be used to anchor the chain ends.

The chain departs from recess 165 to pass about a steering sprocket 169 at the bottom end of turn control rod 67. The rod has a horizontal pin 171 on its top end. A slotted sleeve 172 meshes with the pin. A steering crank 173 with a handle 174 extends from the sleeve and terminates at a convenient height about equal with arm 19 of the wheel chair.

When the crank is turned, chain 167 pulls the turntable about a vertical axis, altering the attitude of the drive wheel with respect to the power carriage and turning the wheel chair in its course. Since the axis of turning of the turntable and the power wheel passes through the horizontal axis of the drive wheel, the wheel chair may turn in a very short arc. The wheel chair with the power drive carriage attached may be turned within the width of the average sidewalk.

Speed and direction control are achieved by an electrical control box 181 of FIG. 3. The control box has a clamping band 184 adapted to clamp about upper tubular frame member 21 of the wheel chair. Depending upon the abilities of the wheelchair user, the speed and direction control may be mounted at other positions.

Figure 14:
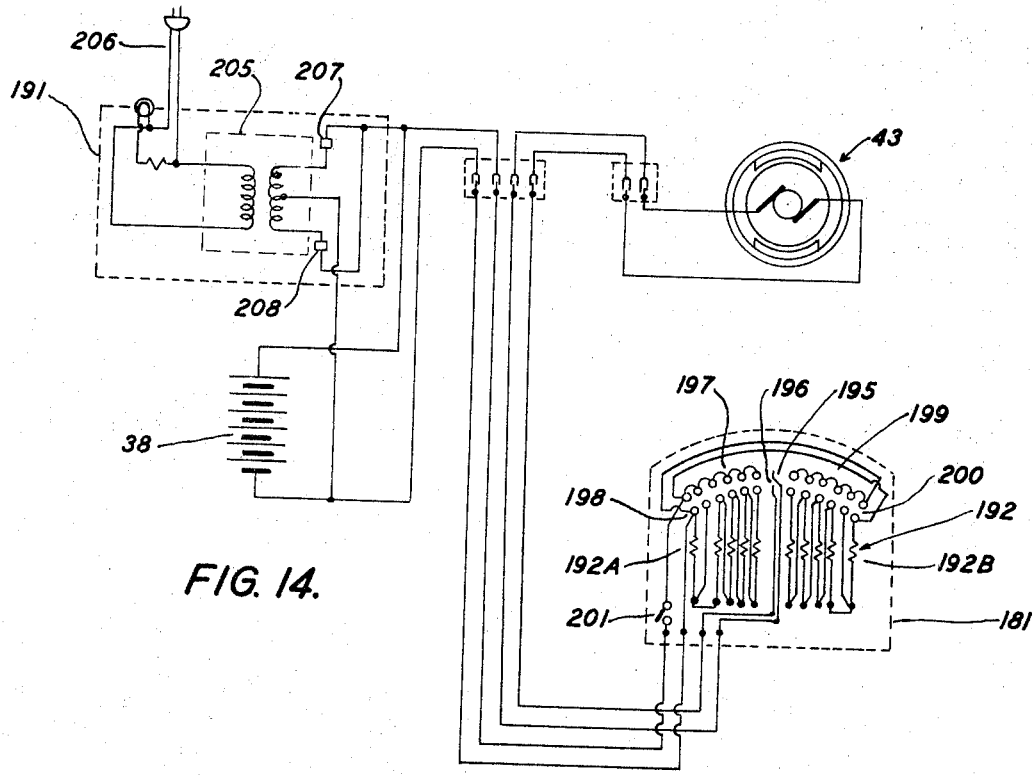
FIG. 14 is a circuit diagram of the electrical components of the power carriage.

The control box has an elongate slot 185 in its top cover. A control handle 186 with a hand knob projects through the slot. A cable 187 connects from the bottom of the control box to a connector 188 on the battery charger. A lead 189 connects between hte battery charger and motor 43. As can be seen from FIG. 14, the battery charger indicated by the dotted lines 191 in that figure is internally wired such that battery 38 is in series with the resistances 192 of the control box. Current flow is thus from the battery through the battery charger connections to the rheostat and from the rheostat to the reversible permanent magnet motor 43. The permanent magnets comprise the field of the motor and the armature thereof is conventionally wound.

The rheostat has brush contacts 195, 196 which are adapted to be selectively registered with the contact groups 197, 198 of the plurality of resistances 192A at the left of the rheostat diagram or with the contact groups 199, 200 of the resistances 192B at the right of the diagram. In the position shown, the brushes are not in contact with any of the contacts and the motor is in "off" condition.

To preclude accidental motion of the wheelchair caused by inadvertent disturbance of control 186, an on-off switch 201 may be used to break the circuit between the battery and the rheostat. The resistors 192A are connected to the opposite pole of the battery from the resistors 192B. Thus when the contacts of one group of resistors are contacted by the brushes, the motor rotates in one direction while opposite direction is achieved when the brushes of the rheostat are in contact with the contacts of the second group of resistances.

The battery charger has a conventional transformer unit 205 and an AC access plug 206. As is conventional, the output coil of the transformer is connected to rectifiers 207, 208 to give full wave rectification of the AC current to a DC flow to recharge the battery. Thus the battery may be recharged without the necessity of removing it from the wheel chair. The battery charger may be provided with other electrical components to protect the battery against overcharge, etc.

The various components of the illustrative embodiment combine to afford a power drive carriage for attachment to wheeled vehicles that is flexible in attachment to accommodate many vehicles, which has great maneuverability and a positive control of both course and speed. Other modifications than those shown may occur to those skilled in this particular art. Therefore, I wish the scope of the invention to be measured by the appended claims, rather than by the merely illustrative embodiment shown and described.

I claim:

1. A power drive carriage for attachment to a wheeled vehicle comprising a shallow bed, an electrical power source on the bed, an electrical motor and motor case on the bed, a drive wheel journalled on the motor case to revolve thereabout, turning means on the bed to which the motor and drive wheel are fixed, said turning means being such that the motor and drive wheel are turnable with respect to the carriage bed about a vertical axis passing through the center of the drive wheel; power transmission means connecting the motor and the drive wheel, motor speed and direction control means adapted to be attached to the wheeled vehicle and connected in series between the power source and the motor, and attachment means on the bed adapted to connect the drive carriage to the wheeled vehicle such that the front pair of vehicle wheels is out of touch with the ground, said attachment means comprising a first horizontally slidable shaft at each rear corner of the bed, a clamp loop at the outer end of each first shaft, means on each loop for restricting the loop; a second horizontally slidable shaft at the front corners of the bed, a perpendicular adjustable arm at the outer end of each second shaft, a clamp loop at the free end of each arm, and adjustable restricting means on each loop.

2. A power drive carriage for attachment to a wheeled vehicle comprising a shallow bed, an electrical power source on the bed, an electrical motor and motor case on the bed, a drive wheel journalled on the motor case to revolve thereabout, turning means on the bed to which the motor and drive wheel are fixed, said turning means being such that the motor and drive wheel are turnable with respect to the carriage bed about a vertical axis passing through the center of the drive wheel; power transmission means connecting the motor and the drive wheel, motor speed and direction control means adapted to be attached to the wheeled vehicle and connected in series between the power source and the motor, and attachment means on the bed adapted to connect the drive carriage to the wheeled vehicle such that the front pair of vehicle wheels is out of touch with the ground, said means for turning the drive wheel and motor about a vertical axis of the wheel comprises a turntable in the bed, a plurality of vertical thrust rollers, a pivot securing each thrust roller to the bed so as to thrust against the upper surface of the turntable, a plurality of radial thrust rollers, a pivot securing each radial thrust roller to the bed so as to bear against the rim of the turntable, each of said radial thrust rollers having a vertical thrust collar adapted to contact the lower surface of the turntable; a steering control journalled in the bed to turn about a vertical axis, a steering sprocket on the lower end of the steering control, and a sprocket chain fixed at each of its ends to the turntable and connecting the steering sprocket and the turntable such that rotation of the control induces rotation of the turntable with respect to the bed, the motor and the drive wheel being attached to the turntable to pivot as a unit therewith.

3. A power drive carriage in accordance with claim 2 wherein a bracket fixed to the carriage bed mounts a thrust roller, a pair of spaced radial thrust rollers, and the vertical thrust collar of each of the radial thrust rollers.

4. A power drive carriage for use on a wheel chair having pairs of front and rear wheels and a tubular frame, the carriage comprising a shallow bed, rear wheels on the bed, an electrical power source on the bed, a turntable mounted in the bed to turn therein in a horizontal plane, a steering control journalled in the bed to turn about a vertical axis, a steering sprocket on the lower end of the control, a handle on the upper end of the control, a sprocket chain fixed at each of its ends to the turntable circumference, the sprocket chain passing about the sprocket and a portion of the turntable such that rotation of the steering control causes rotation of the turntable; a reversible permanent magnet motor and a motor case fixed to the turntable centrally thereof, a drive wheel journalled on the motor case, drive means connecting the motor and the drive wheel, a rheostat adapted to be mounted to the chair frame and electrically connected in series between the power source and the motor; adjustable rear frame connectors on the shallow bed, articulated front connectors on the shallow bed, and means for fastening the front connectors to the chair frame, said attachment means comprising a first horizontally slidable shaft at each rear corner of the bed, a clamp loop at the outer end of each first shaft, means on each loop for restricting the loop about a member of the vehicle; a second horizontally slidable shaft at the front corners of the bed, a perpendicular adjustable arm at the outer end of each second shaft, a clamp loop at the free end of each arm, and adjustable restricting means on each loop for restricting the loop about a member of the wheeled vehicle.

(References on following page)

References Cited

UNITED STATES PATENTS

| | | | |
|---|---|---|---|
| 1,307,944 | 6/1919 | Watson | 180—52 X |
| 2,544,831 | 3/1951 | Guyton | 180—65 X |
| 2,581,551 | 1/1952 | Myrmirides | 180—65 X |
| 2,978,053 | 4/1961 | Schmidt | 180—16 X |
| 2,993,550 | 7/1961 | Klappert | 180—65 X |
| 3,161,249 | 12/1964 | Bouladon et al. | 180—65 |
| 3,166,139 | 2/1965 | Ulinski | 180—13 |
| 3,190,386 | 6/1965 | Swinny | 180—52 X |

BENJAMIN HERSH, *Primary Examiner.*

C. C. PARSONS, *Assistant Examiner.*